US008272510B2

(12) United States Patent
Frayne et al.

(10) Patent No.: US 8,272,510 B2
(45) Date of Patent: Sep. 25, 2012

(54) INFLATABLE STRUCTURE FOR PACKAGING AND ASSOCIATED APPARATUS AND METHOD

(75) Inventors: Shawn Michael Frayne, Tampa, FL (US); Paul Chudy, New York, NY (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 181 days.

(21) Appl. No.: 12/256,245

(22) Filed: Oct. 22, 2008

(65) Prior Publication Data

US 2010/0096290 A1   Apr. 22, 2010

(51) Int. Cl.
*B65D 81/03* (2006.01)
(52) U.S. Cl. .............................. 206/522; 206/591; 383/3
(58) Field of Classification Search ................. 206/522, 206/591, 594, 390; 383/3, 37; 441/40, 41; 5/706, 707, 710, 644, 654, 655.2; 428/35.2, 428/178, 188
See application file for complete search history.

(56) References Cited

U.S. PATENT DOCUMENTS

| | | | |
|---|---|---|---|
| 3,207,420 A | 9/1965 | Navarrete-Kindelan | |
| 4,465,188 A * | 8/1984 | Soroka et al. | 206/522 |
| 4,949,530 A * | 8/1990 | Pharo | 53/449 |
| 5,263,587 A * | 11/1993 | Elkin et al. | 206/522 |
| 5,348,157 A | 9/1994 | Pozzo | |
| 5,351,828 A * | 10/1994 | Becker et al. | 206/522 |
| 5,427,830 A * | 6/1995 | Pharo | 428/35.2 |
| 5,454,642 A * | 10/1995 | De Luca | 383/3 |
| 5,469,966 A * | 11/1995 | Boyer | 206/522 |
| 5,515,975 A | 5/1996 | Jarvis et al. | |
| 5,527,012 A | 6/1996 | Vinkel et al. | |
| 5,803,263 A | 9/1998 | Pozzo | |
| 5,829,492 A | 11/1998 | Gavronsky et al. | |
| 5,830,780 A | 11/1998 | Dennison et al. | |
| 6,276,532 B1 | 8/2001 | Sperry et al. | |
| 6,569,283 B1 | 5/2003 | Sperry et al. | |
| 6,913,803 B2 | 7/2005 | Peper | |
| 6,978,893 B2 | 12/2005 | Peper | |

(Continued)

FOREIGN PATENT DOCUMENTS

DE   39 22 802 A1   1/1991

(Continued)

OTHER PUBLICATIONS

International Search Report for PCT/US2009/061598 mailed Jan. 13, 2010.

(Continued)

*Primary Examiner* — David Fidei
(74) *Attorney, Agent, or Firm* — Alston & Bird LLP

(57) ABSTRACT

An inflatable structure generally includes a valve formed between a pair of edge portions and an internal edge portion formed of a flexible film such that an enclosed chamber of the inflatable structure substantially envelops the internal edge portion. The valve and remainder of the inflatable structure can be formed from a single piece of flexible film using a method of manufacturing an inflatable structure from a continuous web of flexible film. A corresponding inflation device fills the inflatable structure with air and may do so without requiring heat sealing or contact between the inflatable structure and outlet of the inflation device. The inflation device may include a mechanical registration device which can engage an optional locator aperture in the inflatable structure such as to assist in temporarily locating the outlet of the source of pressurized air proximate to the valve in the inflatable structure.

10 Claims, 16 Drawing Sheets

U.S. PATENT DOCUMENTS

| | | | |
|---|---|---|---|
| 7,165,677 B2 | 1/2007 | Tanaka et al. | |
| 7,168,566 B2 | 1/2007 | Anderson et al. | |
| 7,168,567 B2 | 1/2007 | Peper et al. | |
| 7,201,273 B2 | 4/2007 | Chen et al. | |
| 7,228,969 B2 * | 6/2007 | Nakano | 206/522 |
| 7,297,387 B2 * | 11/2007 | Koyanagi | 428/166 |
| 7,681,734 B2 * | 3/2010 | Liao et al. | 206/522 |
| 2002/0153468 A1 | 10/2002 | Folkmar | |
| 2003/0108699 A1 | 6/2003 | Tanaka | |
| 2004/0211697 A1 | 10/2004 | Nakano | |
| 2006/0191817 A1 | 8/2006 | Nishi et al. | |
| 2006/0201960 A1 | 9/2006 | Frayne | |
| 2007/0056647 A1 | 3/2007 | Frayne | |
| 2007/0084745 A1 | 4/2007 | Yoshifusa | |
| 2007/0090013 A1 | 4/2007 | Yoshifusa et al. | |
| 2007/0131575 A1 * | 6/2007 | Abe | 206/522 |
| 2007/0163916 A1 | 7/2007 | Yoshifusa | |
| 2007/0170084 A1 | 7/2007 | Chen et al. | |
| 2007/0295633 A1 | 12/2007 | Liao et al. | |
| 2008/0073238 A1 | 3/2008 | Liao et al. | |
| 2010/0096290 A1 | 4/2010 | Frayne et al. | |
| 2010/0101970 A1 * | 4/2010 | Frayne et al. | 206/522 |

FOREIGN PATENT DOCUMENTS

| | | |
|---|---|---|
| DE | 40 07 128 A1 | 4/1991 |
| DE | 296 12 426 U1 | 10/1996 |
| JP | 4-154571 A | 5/1992 |

OTHER PUBLICATIONS

Sealed Air Ultipack® Automated Void Containment System, *The Ultimate Solution for Automated Void Containment*, Distributed by Sealed Air Corporation (US), Elmwood Park, NJ, Oct. 2008.

Completed International Search Report and Written Opinion for Application No. PCT/US2009/061598 mailed Apr. 12, 2010.

Amendments Under Article 34 and Response filed in International Application No. PCT/US2009/061598 on Aug. 18, 2010.

United States Patent and Trademark Office, Office Action for U.S. Appl. No. 12/603,280, mailed Mar. 15, 2012, 15 pages, USA.

International Preliminary Report on Patentability for Application No. PCT/US2009/061598 dated Dec. 14, 2010.

* cited by examiner

INFLATABLE STRUCTURE FOR PACKAGING AND ASSOCIATED APPARATUS AND METHOD

BACKGROUND OF THE INVENTION

1. Field of the Invention

The present invention generally relates to inflatable structures, and in particular to inflatable structures used in packaging and associated methods and apparatus.

2. Description of Related Art

Inflatable structures constitute an important part of the packaging industry. Inflatable structures are commonly used as cushions to package items, either by wrapping the items in the inflatable structures and placing the wrapped items in a shipping carton, or by simply placing one or more inflatable structures inside of a shipping carton along with an item to be shipped. The cushions protect the packaged item by absorbing impacts that might otherwise be fully transmitted to the packaged item during transit, and also restrict movement of the packaged item within the carton to further reduce the likelihood of damage to the item.

Inflatable packaging has an advantage over non-inflatable packaging in that inflatable packaging can require less raw material to manufacture it. Further, it is known within the art to make inflatable packaging such that it is inflatable on demand. Inflate-on-demand packaging allows the entity using the packaging materials to wait and inflate the packaging materials when needed, such as when shipping an item in a shipping container, as described above. This means that inflate-on-demand packaging materials occupy less space as compared to pre-inflated packaging materials, which makes them easier to store. Additionally, transportation of the packaging materials to the entity using them to package items can be less expensive than it would be if the packaging materials were already inflated because they can be shipped in significantly smaller containers.

Despite the advantages of inflate-on-demand packaging, there is still room for improvement within the art. This is because prior designs typically require the use of costly inflation devices that may be hard for the entity using the packaging materials to operate. In particular, many inflation devices rely upon heat sealing which adds to the complexity and cost of such inflation devices. Further, many inflation devices also necessitate the insertion of an inflation wand into the valve of an inflatable structure, which can be difficult to accomplish, or they may also require careful machine-feeding of the uninflated packaging materials.

Accordingly, a need exists in the art for improved inflatable packaging structures and related inflation apparatus and methods that address the shortcomings of the prior art noted above.

BRIEF SUMMARY OF THE INVENTION

These and other advantages are provided by the inflatable structures presented herein, and which include an integral valve with two edge portions that may be formed from a single web of flexible film in an inline process. Such an inflatable structure and the associated apparatus and methods are capable of providing inflate-on-demand packaging that can be inflated using an inexpensive inflation device, and wherein such inflation is easy to do and does not require the use of an inflation needle, wand, or nozzle, or heat sealing by the entity using the packaging.

In particular, there is herein provided an inflatable structure for use in packaging comprising: at least one flexible film defining an enclosed chamber; at least one one-way valve defined at least in part by the flexible film for receiving pressurized air and thereby inflating the enclosed chamber, wherein the one-way valve comprises an external valve opening that is defined at least in part by edge portions of first and second layers of the flexible film, and further wherein the edge portions of the first and second layers of the flexible film are formed by folding the flexible film. In further respect to the invention, the one-way valve may include an internal edge portion. This internal edge portion can define a channel with one or more seals that join together the first and second layers of the flexible film. One or more slits extend through the seals so as to isolate the valve structure and make the valve resistant to leaking during movement of the inflatable structure. The seals may also be rounded proximate to the external valve opening so as to resist tearing of the flexible film at these locations. With regard to the internal edge portion, it can comprise a fold, a seal, or both a fold and a seal. An internal valve opening may be placed proximate to the internal edge portion. Additionally, the inflatable structure may define a planar direction, and the edge portions can be offset in the planar direction so as to facilitate the entry of air into the external valve opening during inflation.

The inflatable structure may include additional features such as sidewalls that extend from the edge portions and are connected to one another by one or more perimeter seals. Perforations can extend between the perimeter seals so as to allow for separation of the flexible film into multiple inflatable structures. Also, locator apertures can be defined between the perimeter seals for use in locating the valve of the inflatable structure proximate to the outlet of a source of pressurized air.

There is further herein provided an inflation device for inflating inflatable structures used in packaging, comprising: a holder for holding one or more inflatable structures; and a source of pressurized air for inflating the inflatable structure through a valve in the inflatable structure, the source of pressurized air further defining an outlet, wherein the holder holds the inflatable structure at a position such that the outlet of the source of pressurized air is spaced a distance from the inflatable structure to inflate the inflatable structure. As mentioned above the inflation device may further comprise a mechanical registration device wherein the valve in the inflatable structure is proximate to the outlet of the source of pressurized air when the mechanical registration device engages a locator aperture in the inflatable structure. The inflatable structure holder can be configured to dispense a substantially continuous web of inflatable structures, or it can comprise a clamp for holding a cartridge of inflatable structures. When the inflatable structure comprises a first edge portion and a second edge portion that are offset in the planar direction defined by the inflatable structure, the clamp can be configured to hold the second edge portion. Additionally, the holder can comprise a diverter for directing a flow of pressurized air from the outlet of the source of pressurized air toward the valve in the inflatable structure.

There is further herein provided a method of manufacturing an inflatable structure used in packaging, comprising: advancing at least one web of flexible film in a machine direction wherein the flexible film includes a first layer and a second layer joined together along at least one internal edge portion, cutting an aperture in at least one of the first layer and the second layer of the flexible film, sealing the first layer and the second layer of the flexible film together to define a valve, folding the first layer of the flexible film in a direction substantially perpendicular to the machine direction and thereby creating a first edge portion and a first sidewall of the flexible film, folding the second layer of the flexible film in the direction substantially perpendicular to the machine direction and thereby creating a second edge portion and a second sidewall of the flexible film, and sealing together the first sidewall and the second sidewall along one or more perimeter seals to define an enclosed chamber. The method can further comprise folding the flexible film in the direction substantially perpendicular to the machine direction to create the internal edge portion, sealing together the first layer and the second layer of the flexible film in the machine direction to create the internal edge portion, or a combination of both of these steps. The step of sealing together the first layer and the second layer of the flexible film to define the valve can comprise intermittently discontinuing the sealing to create the external valve opening.

Further, a slit may be formed along at least a portion of the seals defining the valve, which, as previously described, helps the valve to maintain a seal during movement of the inflatable structure. Additionally, another step may include perforating the flexible film proximate to the perimeter seals defining the enclosed chamber to allow for separation of the inflatable structures. Also, locator apertures may be formed in the flexible film proximate to the perimeter seals defining the enclosed chamber so as to assist in locating the valve near an outlet of a source of pressurized air during inflation. With regard to the rounded portions of the seals between the first and second layers of the flexible film, these may be created by spot sealing the first layer and the second layer of the flexible film together proximate to one or more ends of the seals defining the valve. Creation of the edge portions can occur through folding the first layer of the flexible film and folding the second layer of the flexible film and offsetting the first edge portion and the second edge portion in a planar direction defined by the inflatable structure. Additional steps can include cutting the web of flexible film proximate to the perimeter seals to create multiple inflatable structures, and connecting the second edge portions of the multiple inflatable structures to thereby form a cartridge of inflatable structures. Another step could include forming an aperture in the flexible film proximate to the internal edge portion to create the internal valve opening.

There is further herein provided a method of inflating inflatable structures used in packaging, comprising: holding an inflatable structure at a position such that an outlet of a source of pressurized air is spaced a distance from the inflatable structure, and filling the inflatable structure with a desired amount of the air from the source of pressurized air. Additional steps could include repeating the above steps until a desired number of the inflatable structures has been filled, and removing the inflatable structures that have been filled. Further, a mechanical registration device may engage a locator aperture in the inflatable structure when the valve is proximate to the outlet of the source of pressurized air. A later step could then include disengaging the locator aperture from the mechanical registration device when the inflatable structure is filled with the desired amount of air from the pressurized air source. Alternatively, or additionally, a visual indicator may be used to determine when the valve is proximate to the outlet of the source of pressurized air. Further, the step of removing the inflatable structures that have been filled can comprise tearing off the inflatable structures that have been filled from a continuous web of the inflatable structures, or unclamping the inflatable structures that have been filled from a cartridge of inflatable structures. Also, the flow of air from the source of pressurized air may be diverted to the valve using a diverter. Additionally, an inflatable structure may be deflated by inserting an elongate object through the valve, and later the inflatable structure may be re-inflated. With regard to the step of filling the inflatable structure with the desired amount of the air from the source of pressurized air, it may comprise restricting one or more dimensions of the inflatable structure, such as by using dimension restriction structures.

These and other aspects and features of the invention may be better understood with reference to the following description and accompanying drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
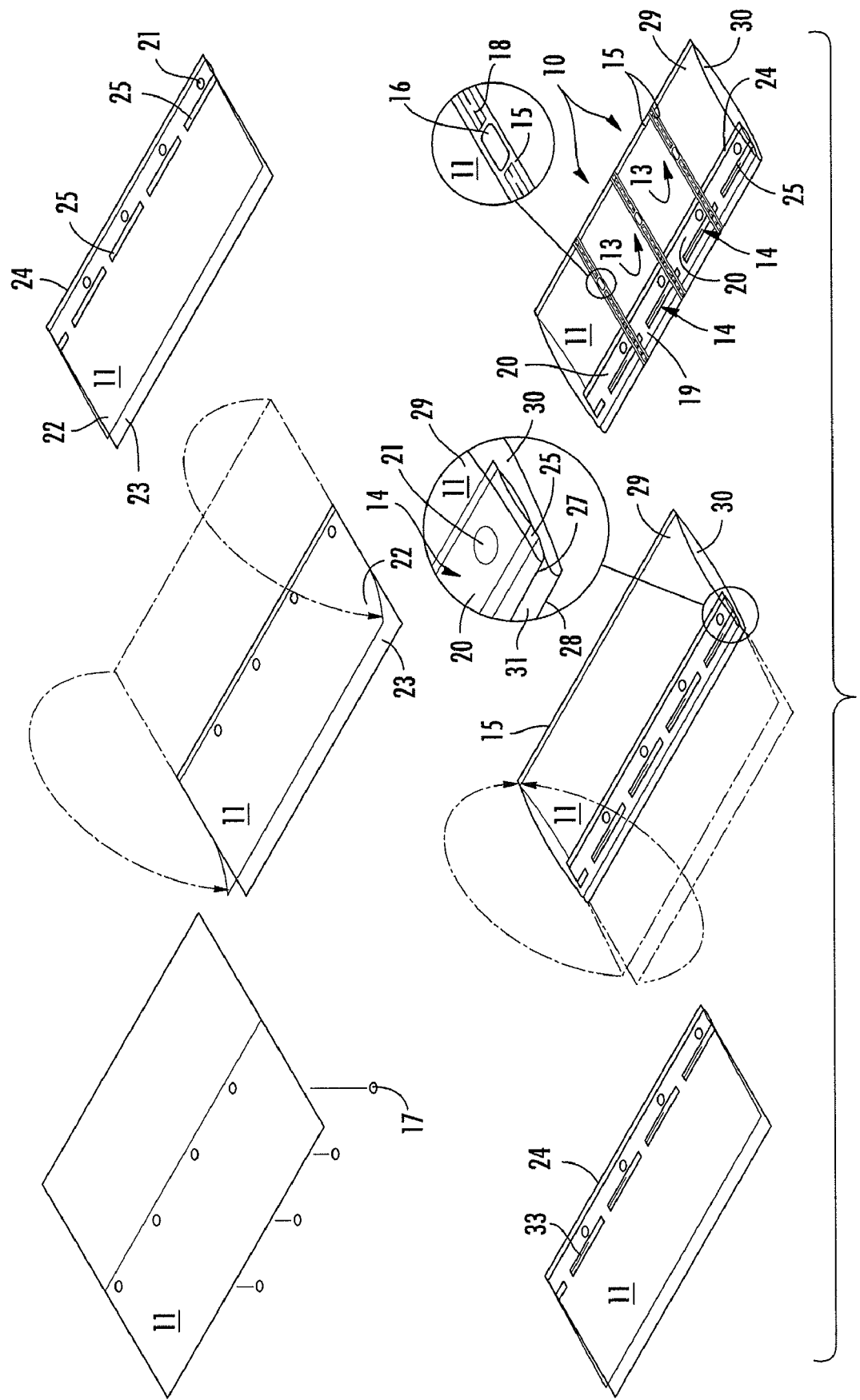
FIG. 1 is a perspective view of an embodiment of an inflatable structure with integral valve in various states of completion wherein the internal valve opening comprises a round hole and the locator aperture is rectangular in shape with rounded corners.

With reference to FIG. 1, there is provided an inflatable structure 10. In this embodiment, a single piece of flexible film 11 has been formed into multiple inflatable structures 10. The inflatable structures 10 may be formed advantageously from a unitary piece of flexible film 11 in an inline process or they may be formed from multiple pieces of flexible film. Methods of manufacturing the inflatable structures 10 will be discussed below.

As used herein, the term "flexible film" refers to a material that has the ability to change into a large variety of determinate and indeterminate shapes without damage thereto in response to the action of an applied force, and return to its general original shape when the applied force is removed. Flexible films 11 of a thickness of 1 or 2 mil can be used, although films of other thicknesses could alternatively be used. In particular, it may be possible to use flexible films 11 of even thinner thicknesses. This is because this type of inflatable structure 10 may be created in a tightly controlled manufacturing setting, such as the inline manufacturing process that will be described later. In contrast, other types of inflate-on-demand inflatable packaging typically require heat sealing in a packaging environment by the end user. In such a setting it is more difficult to control the heat sealing process, and hence thicker film may be required to allow for a margin of error.

Examples of flexible films 11 include various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethyl ene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The flexible film 11 may be monolayer or multilayer and can be made by any known coextrusion process by melting the component polymer(s) and extruding or coextruding them through one or more flat or annular dies. Composite, e.g., multilayered, materials may be employed to provide a variety of additional characteristics such as durability, enhanced gas-barrier functionality, etc.

Returning to the embodiment shown in FIG. 1, the inflatable structure 10 generally comprises a flexible film 11 defining an enclosed chamber 13 and a one-way valve 14 defined at least in part by the flexible film. As used herein, "one-way" is meant to describe a valve 14 that allows fluid flow in one direction, but substantially impedes it in the opposite direction. However, the valve 14 may allow for flow in both directions if, for example, an elongated object is inserted into the valve. This therefore allows for the reusability of the inflatable structures 10 herein described. With regard to the enclosed chamber 13, it substantially encloses the valve 14 within perimeter seals 15. Some of the perimeter seals 15 have locator apertures 16 between them, which exist where portions of the flexible film 11 have been removed, or a slice in the flexible film has been made. As will be described later, these assist in the filling of the inflatable structures 10 with air. Some of the perimeter seals 15 further have perforations 18 between them such that individual inflatable structures 10 may be separated from other inflatable structures. The perimeter seals 15 may take the form of a double cross seal. Use of such a double cross seal or a single wide seal prevents the inflatable structure 10 from leaking at the locator aperture 16 and the perforations 18. Thus the locator apertures 16 are "between" the perimeter seals 15 in the sense that they are surrounded on both sides by at least a portion of a perimeter seal.

Figure 2:
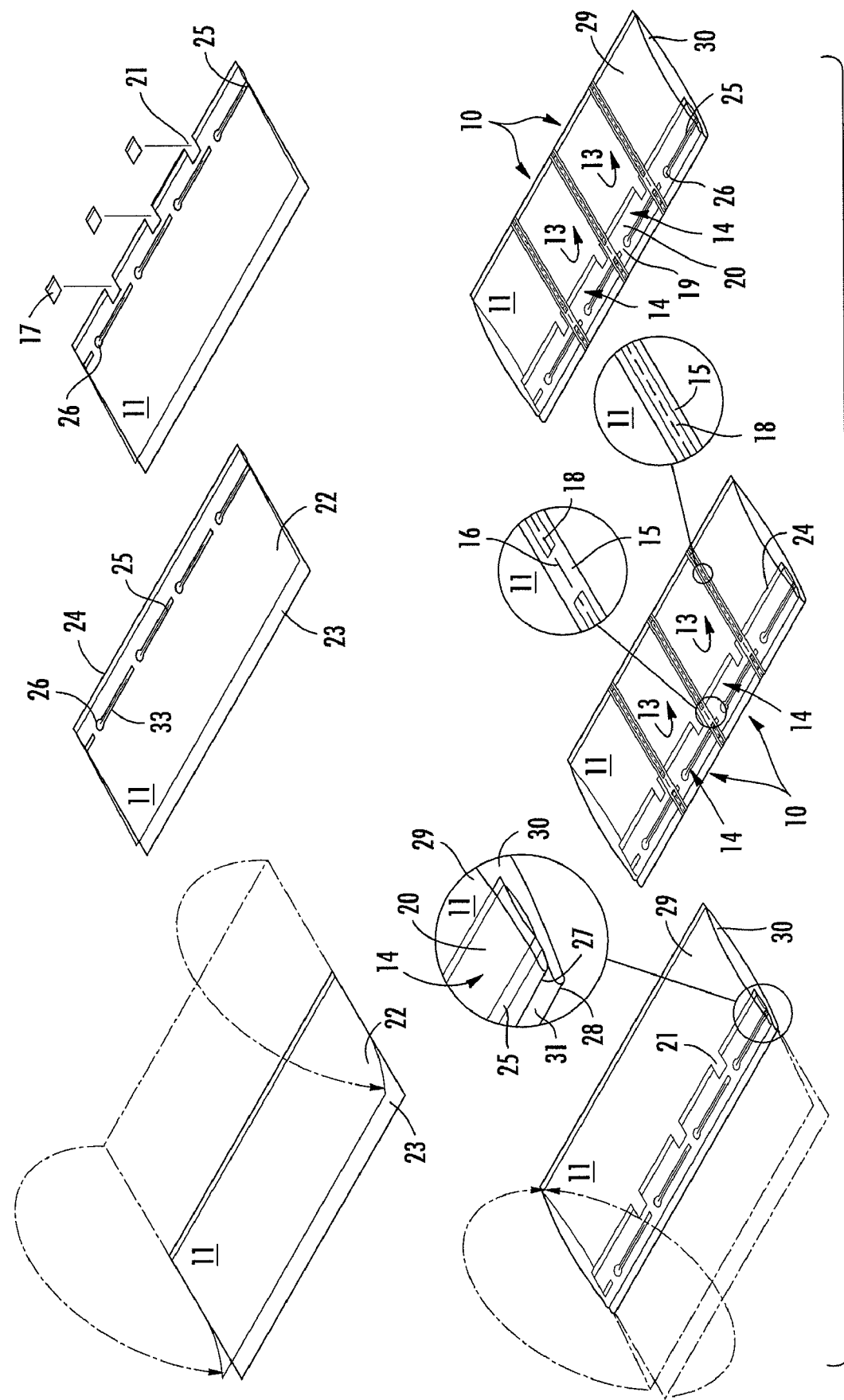
FIG. 2 is a perspective view of an embodiment of an inflatable structure with integral valve in various states of completion wherein the internal valve opening comprises a notch and the locator aperture comprises a slit.
Figure 3:
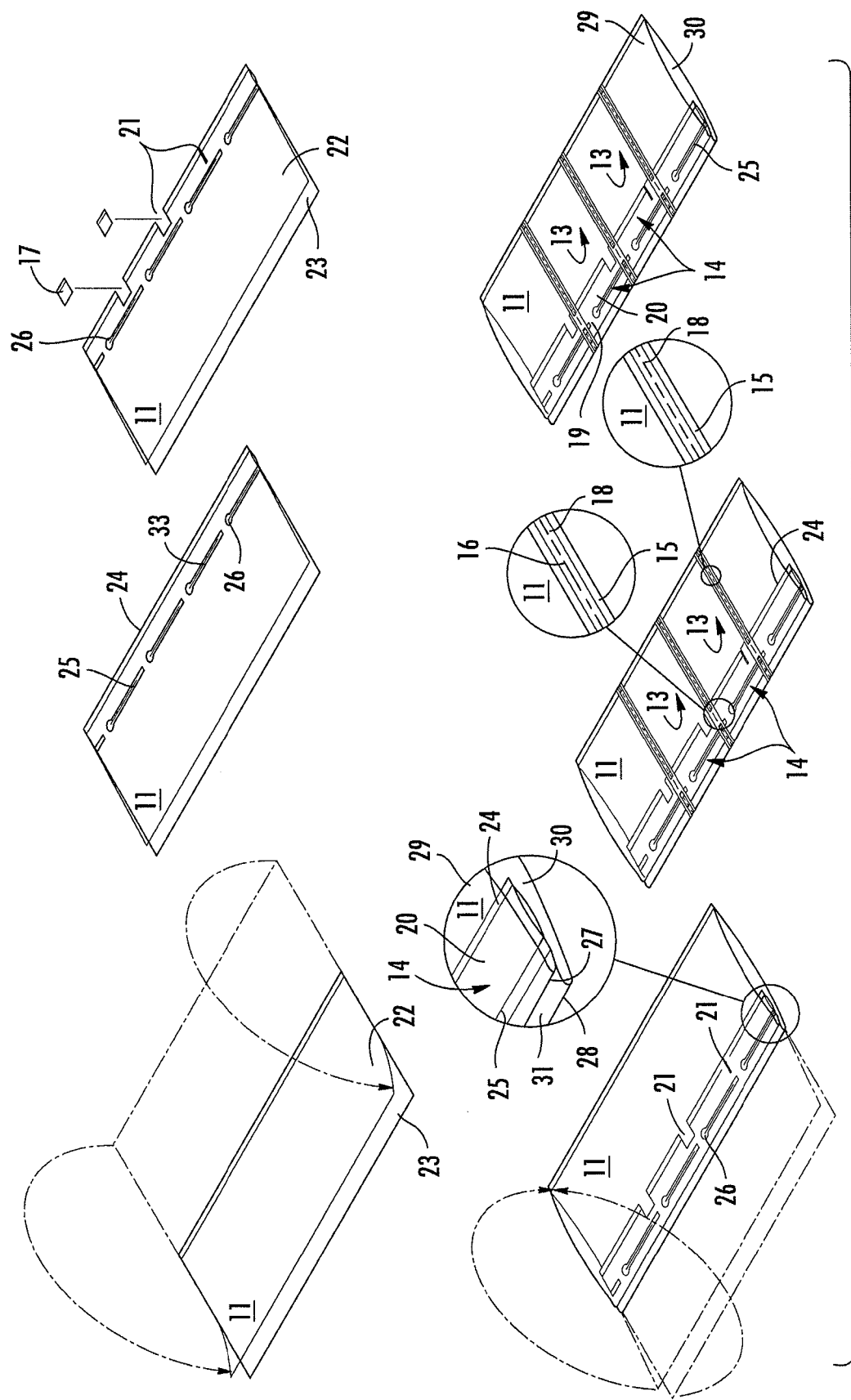
FIG. 3 is a perspective view of an embodiment of an inflatable structure with integral valve in various states of completion wherein internal valve openings comprise notches and a slit and wherein the locator aperture comprises a slit.
Figure 4:
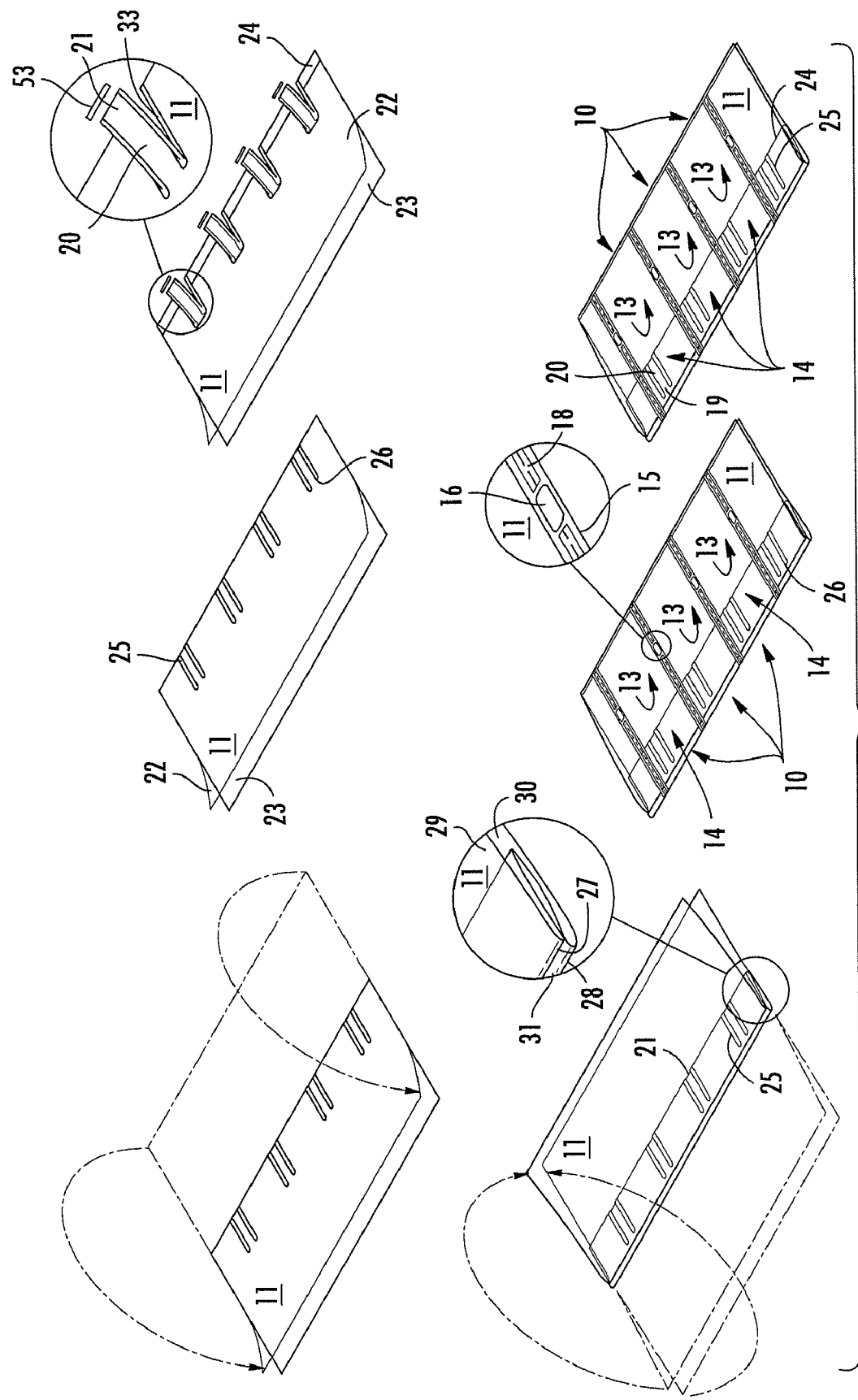
FIG. 4 is a perspective view of an embodiment of an inflatable structure with integral valve in various states of completion wherein the internal valve opening comprises a cut-off portion and wherein the seals run substantially perpendicular to the internal edge portion.
Figure 5:
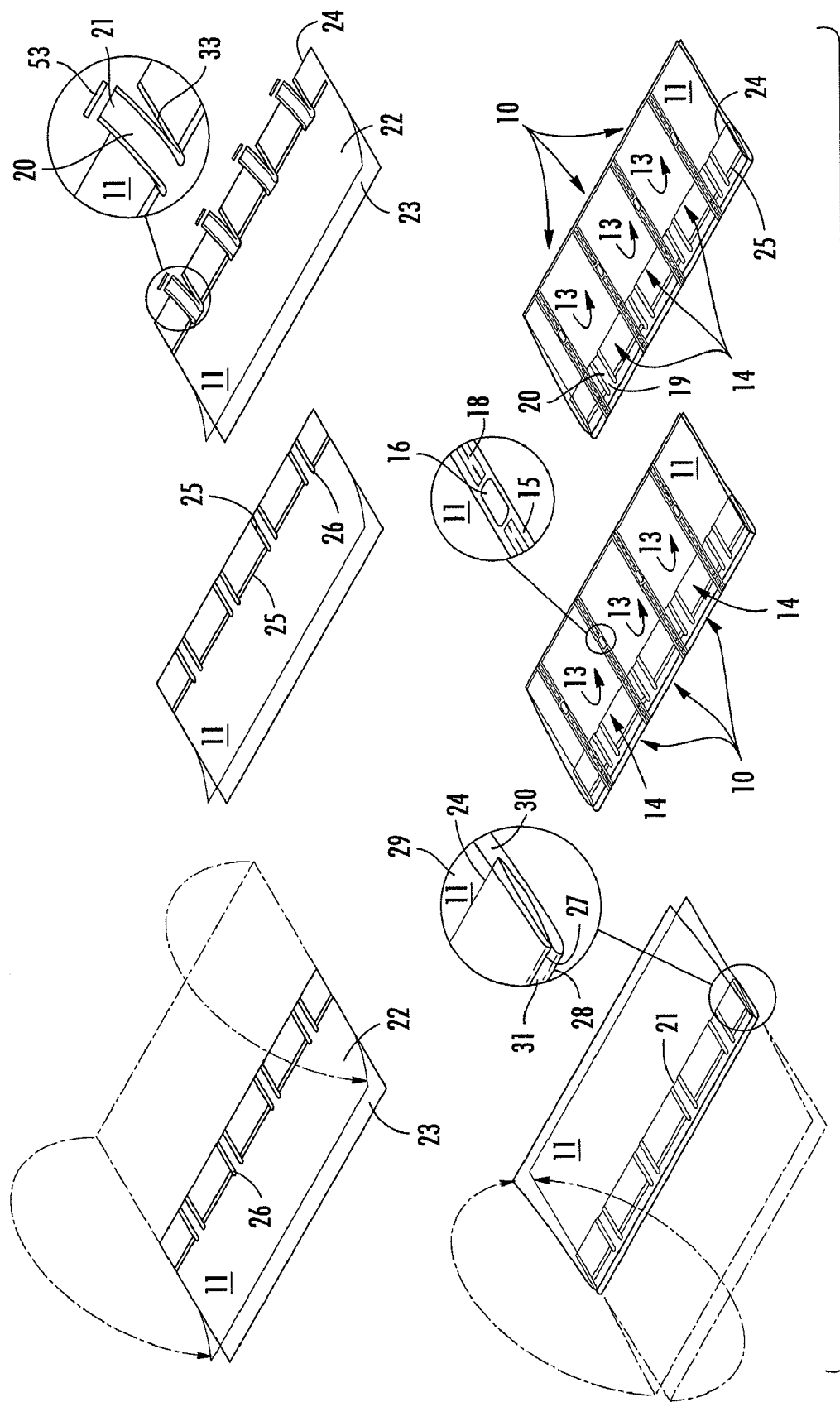
FIG. 5 is a perspective view of an embodiment of an inflatable structure with integral valve in various states of completion wherein the internal valve opening comprises a cut-off portion and wherein the seals run both substantially perpendicular to and substantially parallel with the internal edge portion.
Figure 6:
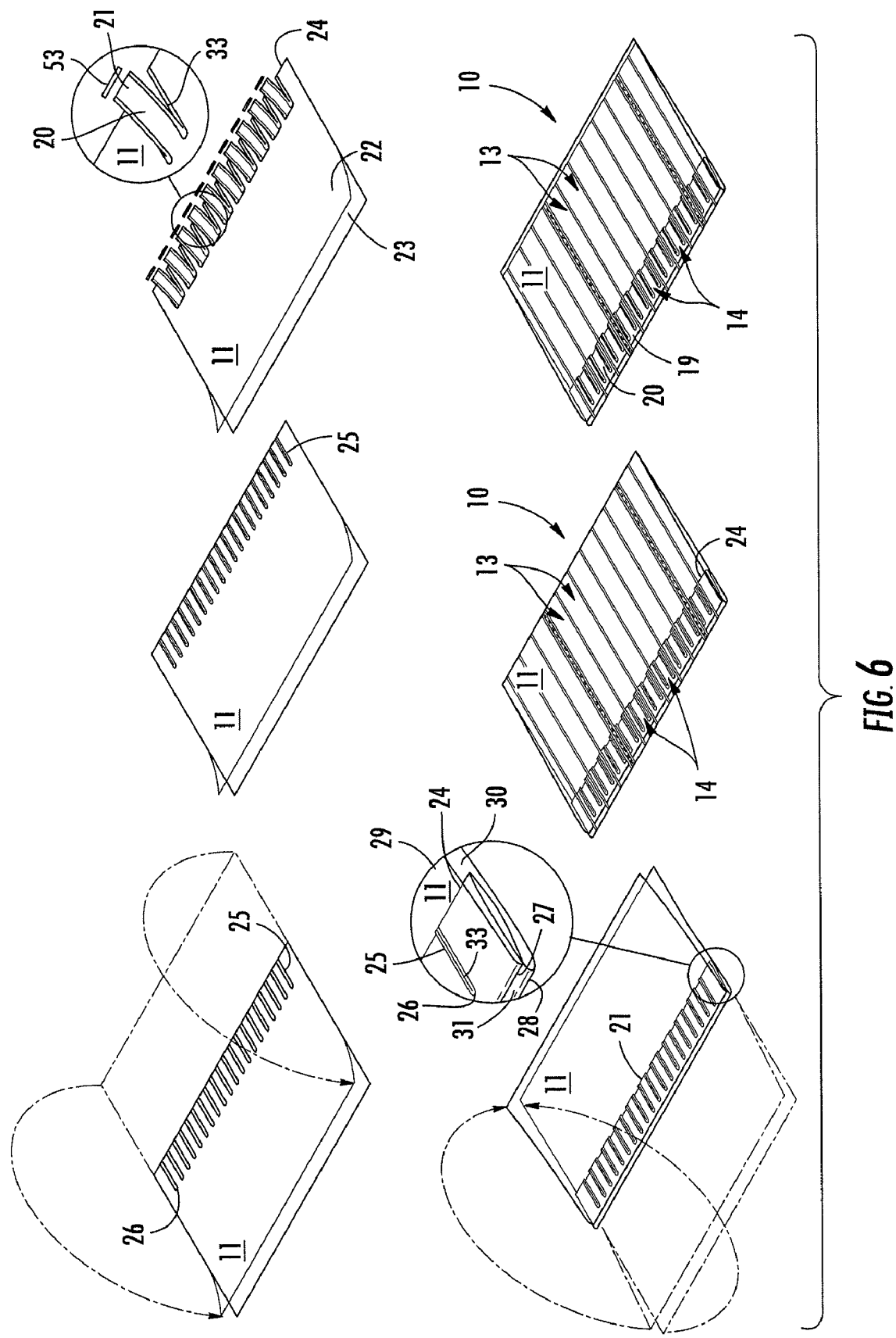
FIG. 6 is a perspective view of an embodiment of an inflatable structure with integral valve in various states of completion wherein there are multiple enclosed chambers in each inflatable structure.
Figure 7:
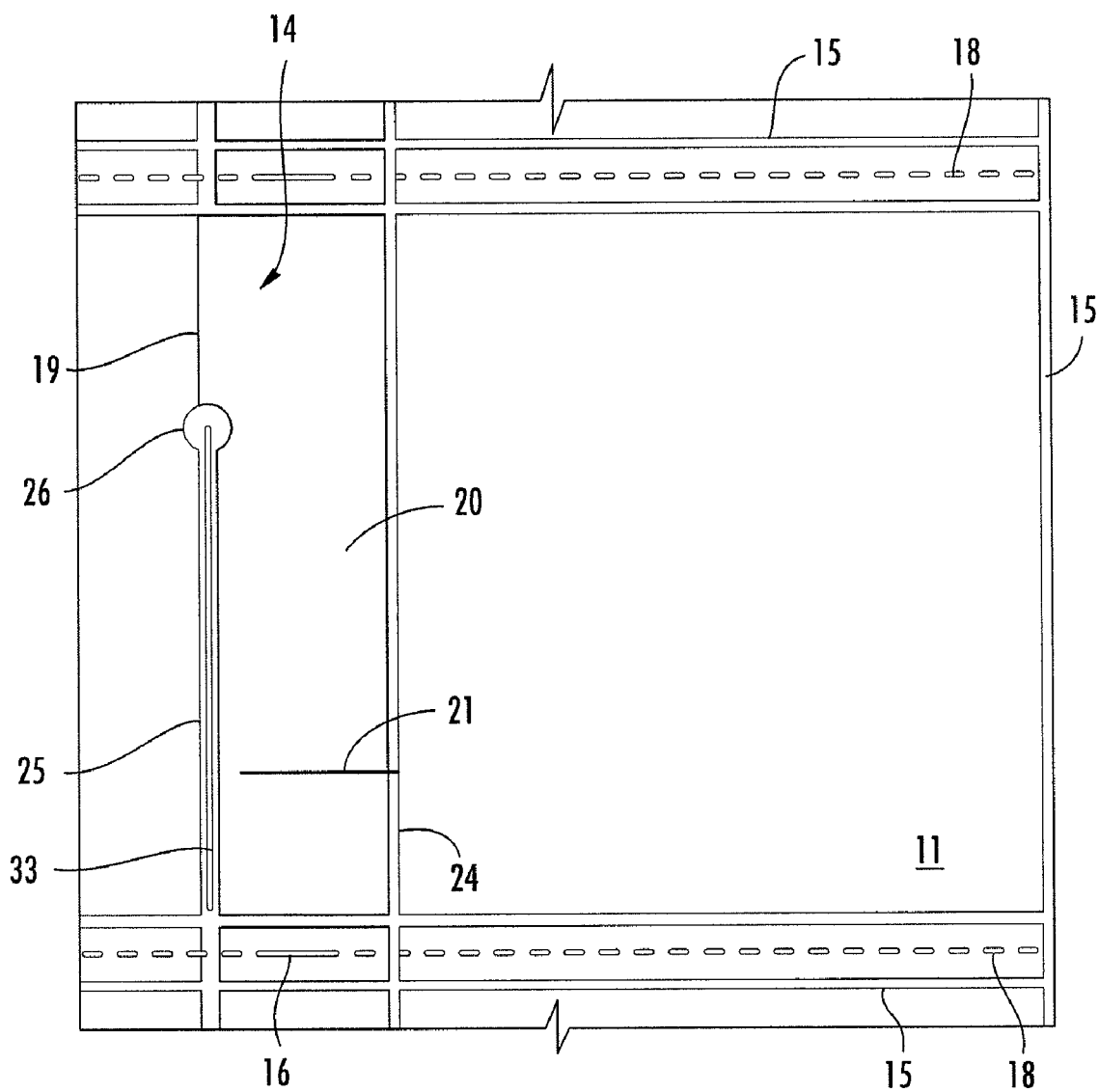
FIG. 7 is a top view of an embodiment of a completed inflatable structure with integral valve wherein the seal is rounded and the locator aperture comprises a slit.

The valve 14 itself has a number of elements. It is comprised of an external valve opening 19, which serves as an inlet, a channel 20, and an internal valve opening 21 which communicates with the enclosed chamber 13. The valve 14 is defined by a first layer 22 of flexible film 11 and an opposing second layer 23 of flexible film. The internal valve opening 21 may be comprised of a hole in the second layer 23 of the flexible film 11, as shown in FIG. 1. The internal valve opening 21 can also take a number of additional forms, such as a notch resulting from the removal of a scrap portion 17, as shown in FIGS. 2 and 3, or an edge resulting from the removal of a scrap portion 53, as shown in FIGS. 4, 5, and 6, or a slit, as shown in FIGS. 3 and 7. Thus, it can be seen that the internal valve opening 21 can be created in the first layer 22, the second layer 23, or both the first and second layers of the flexible film 11.

One side of the valve 14 is bounded by an internal edge portion 24 which can comprise a fold, a weld, or a combination of the two between the first layer 22 and the second layer 23 of the flexible film 11. The other side of the valve 14, which helps to define the channel 20, is bounded by discontinuous seals 25 between the first and second layers 22, 23. The discontinuity of the seals 25 forms an external valve opening 19 at locations where the seal does not exist. Thus, the external valve opening 19 is capable of communicating with the channel 20 and the internal valve opening 21.

The seals 25 may be formed in a variety of different ways. For example, they may run substantially parallel to the internal edge portion 24, as shown in FIGS. 1-3, 7, 8, 14, and 15, they may run substantially perpendicular to the internal edge portion, as shown in FIGS. 4 and 6, or they may run both substantially perpendicular to the internal edge portion and substantially parallel to the internal edge portion, as shown in FIG. 5. Further, the seals 25 may be rounded at a portion 26 proximate to the external valve opening 19, as shown in FIGS. 2-7 and 15. Rounding the seals 25 helps make the inflatable structures 10 more tear resistant by dispersing loads on the flexible film 11.

Additional features of the valve 14 include a pair of edge portions 27, 28. A first fold in the flexible film 11 results in the formation of first edge portion 27 and a sidewall 29 of the flexible film. A second fold in the flexible film 11 results in the formation of a second edge portion 28 and an additional sidewall 30 of the flexible film. The two sidewalls 29, 30 of the flexible film 11 then substantially envelop the valve 14 and form the enclosed chamber 13 by sealing together at least the two sidewalls with perimeter seals 15. The perimeter seals 15 may also seal together the first and second layers 22, 23 of the flexible film 11 to close off the valve 14 and prevent it from communicating with the valves of neighboring inflatable structures 10. Additionally, the second edge portion 28 can be offset from the first edge portion 27 in a planar direction defined by the inflatable structure 10. As most easily seen in FIG. 8, this arrangement creates a gutter 31 between the first and second edge portions 27, 28 which aids in filling the inflatable structure 10 with air. In particular, air flow 32 directed in a direction perpendicular to the planar direction or the inflatable structure will be deflected into the valve 14 by the edge portion extending further outwardly from the valve (e.g. edge portion 28 in FIG. 1).

Another feature that may be present in the valve is slits 33, which may be provided along the midline of the seals 25. The slits 33 function to separate the valve 14 from the rest of the inflatable structure 10 to some degree, and therefore help to prevent accidental discharge of the air from the enclosed chamber 13 of a filled inflatable structure when it is vibrated or otherwise disturbed.

An additional embodiment of the inflatable structure 10 is shown in FIG. 6. This embodiment is similar to the other previously described embodiments, but differs in that it uses multiple enclosed chambers 13 with corresponding valves 14. In other words, instead of having one valve 14 and one enclosed chamber 13 per inflatable structure 10, there are multiple valves and multiple enclosed chambers per inflatable structure. This is accomplished by using a narrower enclosed chamber 13 as well as perimeter seals 15 which do not extend between every enclosed chamber. This embodiment is configured to be used in wrapping items for shipment.

Figure 8:
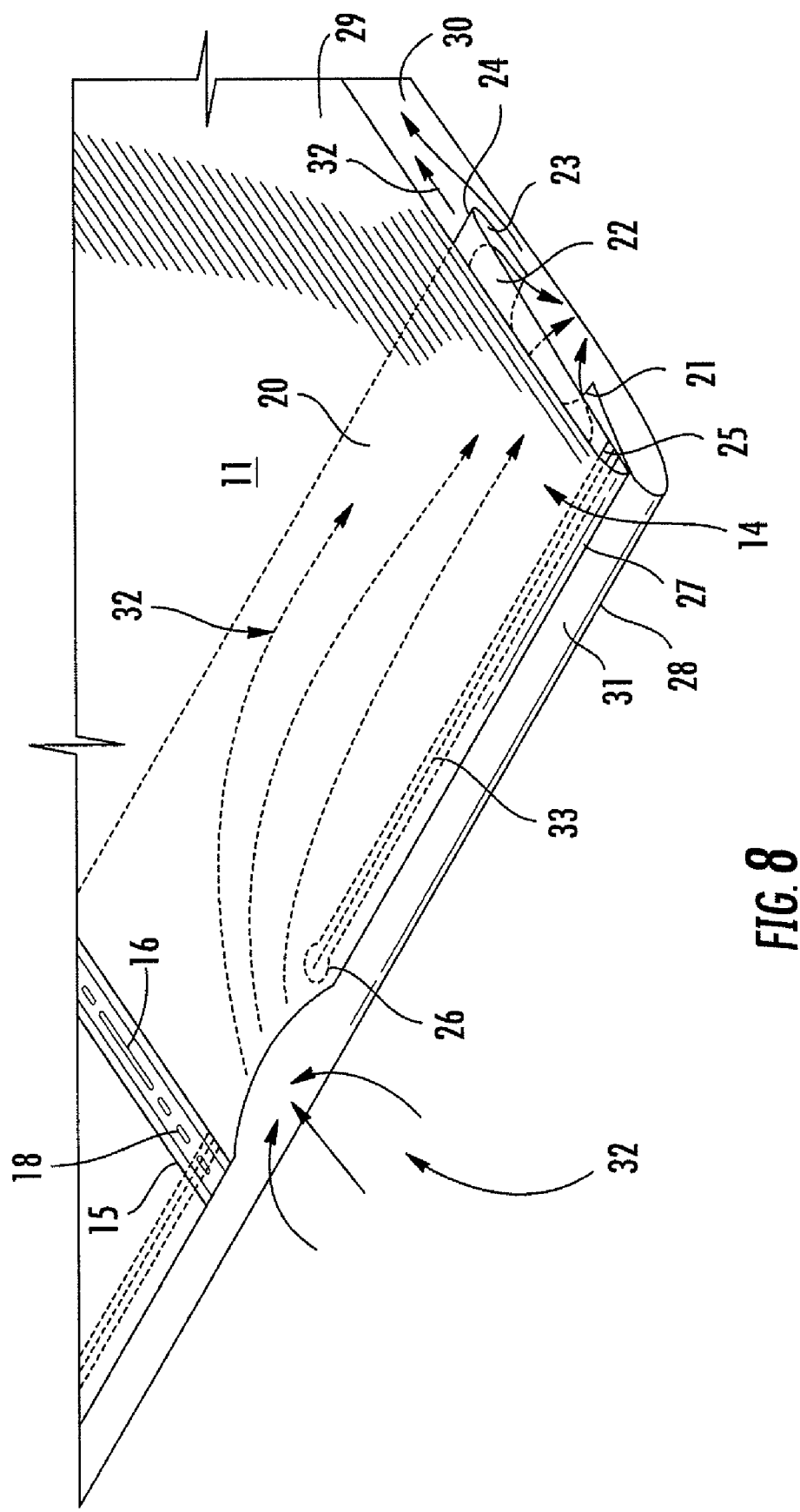
FIG. 8 is a cutaway view showing the inner portions of an embodiment of an inflatable structure and the air flow that occurs through the inflatable structure during inflation wherein the internal valve opening comprises a round hole.

The inflatable structures 10 discussed above are capable of inflation-at-a-distance. This means that the structure of the valve 14 allows air flow 32 to temporarily open the valve without necessitating contact between the inflatable structure 10 and any inflation wand, needle, nozzle, or other similar structure. Inflation-at-a-distance is depicted in FIG. 8 wherein the valve 14 is shown being opened by the air flow 32. Once the air flow 32 has ceased, or the valve 14 is moved out of the proximity of the air flow, the first and second layers 22, 23 of flexible film 11 seal together, which keeps the air sealed in the enclosed chamber 13.

After inflation and use, the inflatable structures 10 may be disposed of, reused, or recycled. When disposing of used inflatable structures 10, the volume of the inflatable structures may be reduced dramatically by either rupturing the inflatable structures or by releasing the air from each inflatable structure via the valve 14. If an elongated object, such as a pen or straw is inserted into the valve 14, the seal created by the valve can be temporarily broken. This action will lead to the release of air from the inflatable structure 10, thereby deflating it. Reuse of the inflatable structures 10 is relatively simple in that the inflatable structures can be re-inflated without necessitating the use of an inflation needle, as a person may simply blow towards the external valve opening 19 of the valve 14 to refill it.

Having described the features of the inflatable structures 10, methods of forming the inflatable structures will now be described. It is to be recognized that it is possible to form the claimed inflatable structures 10 in a number of ways. The following descriptions are meant only to provide examples of possible methods of forming the inflatable structures 10. In particular, the order of operations could be changed. Further, the particular manner of carrying out an operation could also be changed. However, it is of note that the manufacturing process may not require handwork for assembly. In contrast to many other types of inflatable packaging, the inflatable structures 10 can be created in an inline manufacturing process without requiring handwork, which greatly reduces production costs and production times.

Figure 9:
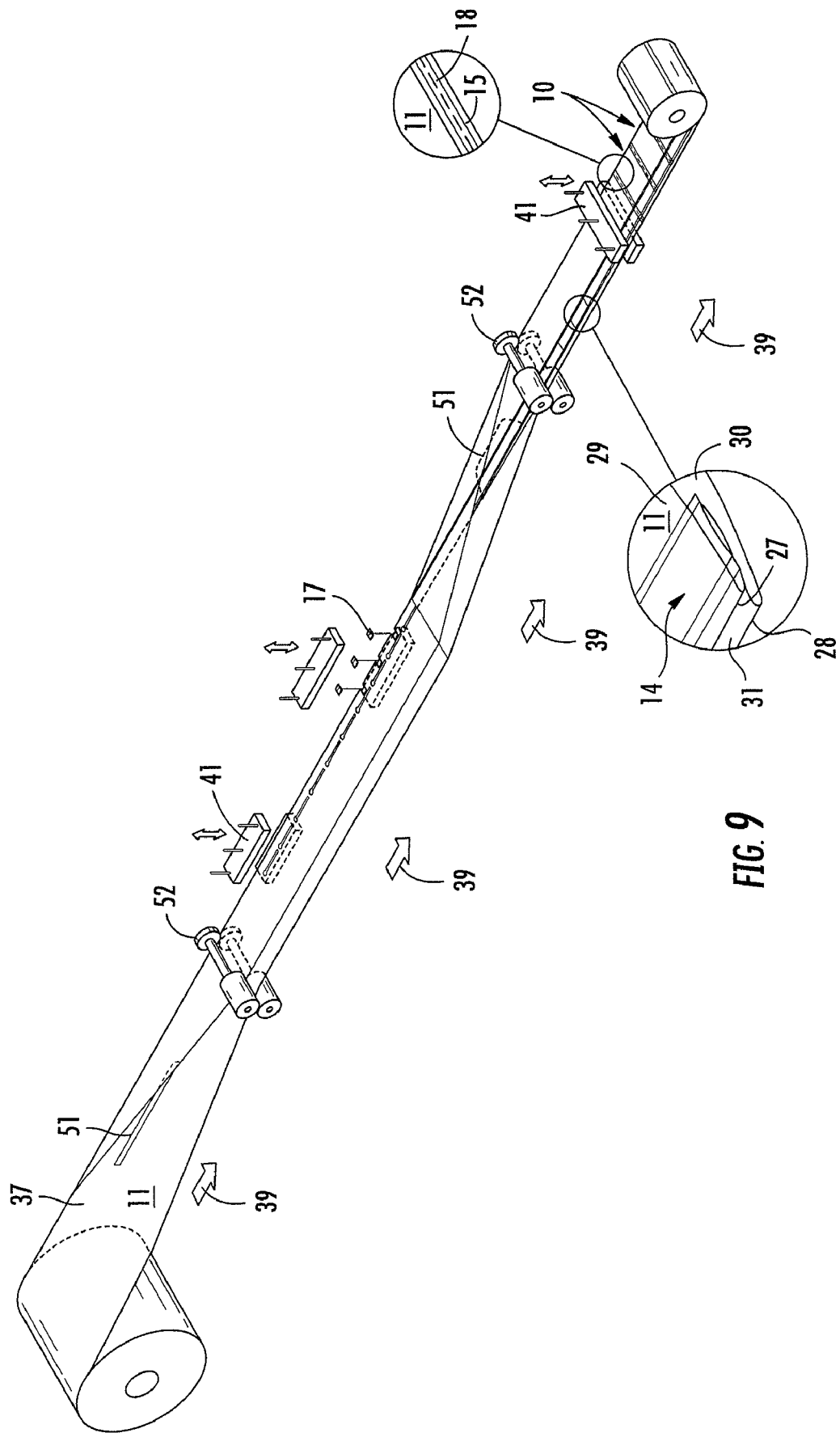
FIG. 9 is a perspective view of an embodiment of an inflatable structure inline manufacturing process.

One such method of forming an inflatable structure 10, as shown in FIG. 9 comprises advancing a continuous web 37 of flexible film 11 in a machine direction 39 and folding the flexible film in a direction perpendicular to the machine direction to create the internal edge portion 24. Such a fold may be created by using a folding plow 51. The internal edge portion 24 can alternatively be formed by sealing together two layers 22, 23 of flexible film 11, or by both folding and sealing together two layers of flexible film. Such a seal can be created using a rolling sealer 52. An additional step is to seal the first layer 22 of flexible film 11 and the second layer 23 of flexible film together to create seals 25 that define the valve 14. The internal valve opening 21 may be created by forming an aperture in either or both of the first and second layers 22, 23 of the flexible film 11 proximate to the internal edge portion 24. As previously discussed, this can comprise slicing a slit in the flexible film 11, punching out a hole or cutting off a scrap portion 17 to create a notch, or slicing off a scrap portion 53 of flexible film. Another step is to fold the first layer 22 of flexible film 11 and the second layer 23 of flexible film in directions substantially perpendicular to the machine direction 39 to create the first edge portion 27 and the first sidewall 29 of the enclosed chamber 13. Also, the second layer 23 of flexible film 11 is folded in a direction substantially perpendicular to the machine direction 39 to create the second edge portion 28 and the second sidewall 30 of the enclosed chamber 13. Folding plows 51 can be used to create these folds.

Further, the sidewalls 29, 30 may be sealed together to create perimeter seals 15 that form the enclosed chamber 13. A rolling sealer 52 and a sealing bar 41 may be used to create the perimeter seals 15. It is to be understood that the perimeter seals 15 do not have to be placed at the edges of the layers 22, 23 of the flexible film 11. Rather, "perimeter" is meant to describe the perimeter seals' function as to define bounds of the enclosed chamber 13. The perimeter seals 15 can be placed near the edges of the two sidewalls 29, 30 and they can also extend between what will then become two separate inflatable structures 10. The perimeter seals 15 may also seal together the first and second layers 22, 23 of the flexible film 11 so as to prevent the valve 14 from communicating with the valves of neighboring inflatable structures 10.

The perimeter seals 15 may further be perforated so as to allow for the separation of the inflatable structures 10 from one another. Also, locator apertures 16 may extend between the perimeter seals 15 so as to allow for engagement with a mechanical registration device 40, as will be described later. With regard to the location of the perforations 18 and locator apertures 16, they may extend directly through the sealed portion of the flexible film 11, or they may extend between two adjacent seals when, for example, the perimeter seals 15 comprise a double cross seal. Both such arrangements keep the perforations 18 and locator apertures 16 from piercing the enclosed chamber 13, which would inhibit the ability of the inflatable structure 10 to maintain an inflated state.

With regard to the seals 25 and perimeter seals 15, such terminology is meant to broadly cover various types of sealing arrangements. For example, they can include welds created by heat sealing or use of adhesive or cohesive bonds. It should then be understood that while specific terms have been applied to describe such joining arrangements, the terms are used in a generic and descriptive sense only, and not for the purposes of limitation.

With further regard to the seals 25 in particular, they may be discontinuous, as discussed above. Discontinuous seals 25 herein refer to seals that have breaks where the first layer 22 and second layer 23 of the flexible film 11 are not sealed to one another. The discontinuity may be the result of using a heat weld with portions of the first layer 22 of flexible film 11 and the second layer 23 of flexible film having a heat-resistant substance 34, such as heat resistant ink, between them. This results in the creation of the external valve opening 19 at the discontinuity. It is of note, however, that the channel 20 of the valve 14 itself may be formed without the use of heat-resistant ink. This is beneficial since most heat-resistant inks develop a small amount of tackiness when heat is applied. This tack is usually not an issue when inflatable structures 10 with more conventional valves are concerned, since a rigid structure such as an inflation needle is typically used to force open the valve channel prior to inflation. However, when performing inflation at a distance, air pressure opens the valve channel 20. Therefore, in order to reduce the air pressure needed to accomplish this, any potential source of tack should be reduced.

This is accomplished in the present valve 14, which does not require heat resistant ink in the channel 20 of the valve. In particular, the machine seal 25 of the present invention can be made in a discontinuous manner by using a heated roller with gaps in the sealing surface corresponding to the discontinuities. A heated sealing bar 41 with gaps in the sealing surface corresponding to the discontinuities could also be used, or a sealing bar without gaps in the sealing surface could be used in conjunction with another type of heat resistance substance such as pieces of TEFLON® placed at each discontinuity. Alternatively, a heated sealing bar 41 without gaps could be used, in combination with an intermittent advance of the flexible film 11 which may be accomplished by a variety of known means such as by application of a dancer bar, to allow for a discontinuous seal 25.

Further, the seals 25 may have a rounded portion 26, as previously discussed, which helps to prevent tears of the flexible film 11. This can be created by spot sealing the first layer 22 of the flexible film 11 to the second layer 23 of the flexible film proximate to the end of a seal 25. Also, an additional step can include slicing a slit 33 into the seals 25. As previously discussed, this helps to keep the valve 14 from accidentally opening.

Figure 14:
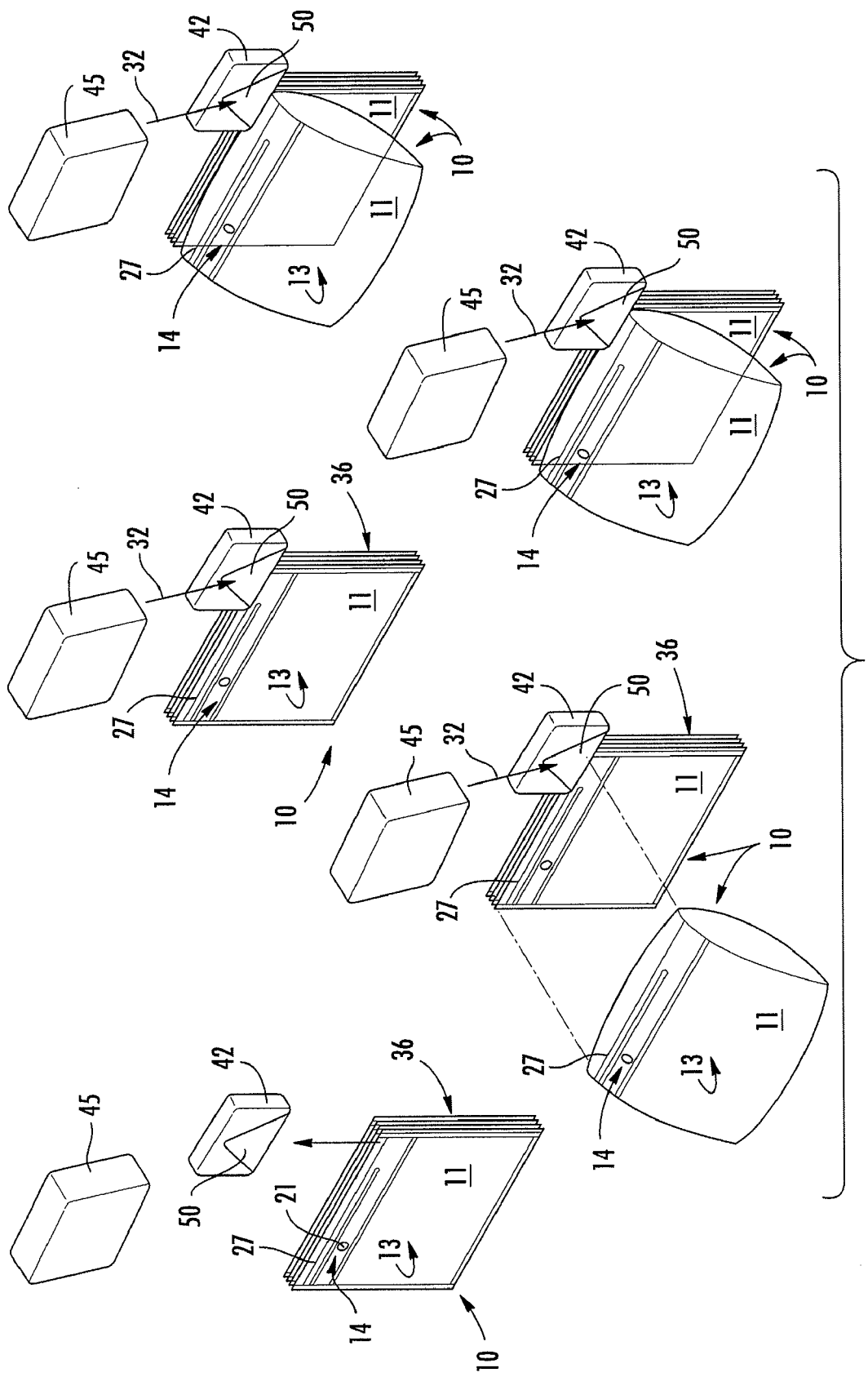
FIG. 14 is a perspective view of an embodiment of a cartridge-based inflatable structure inflation device in operation wherein the holder comprises a clamp.
Figure 15:
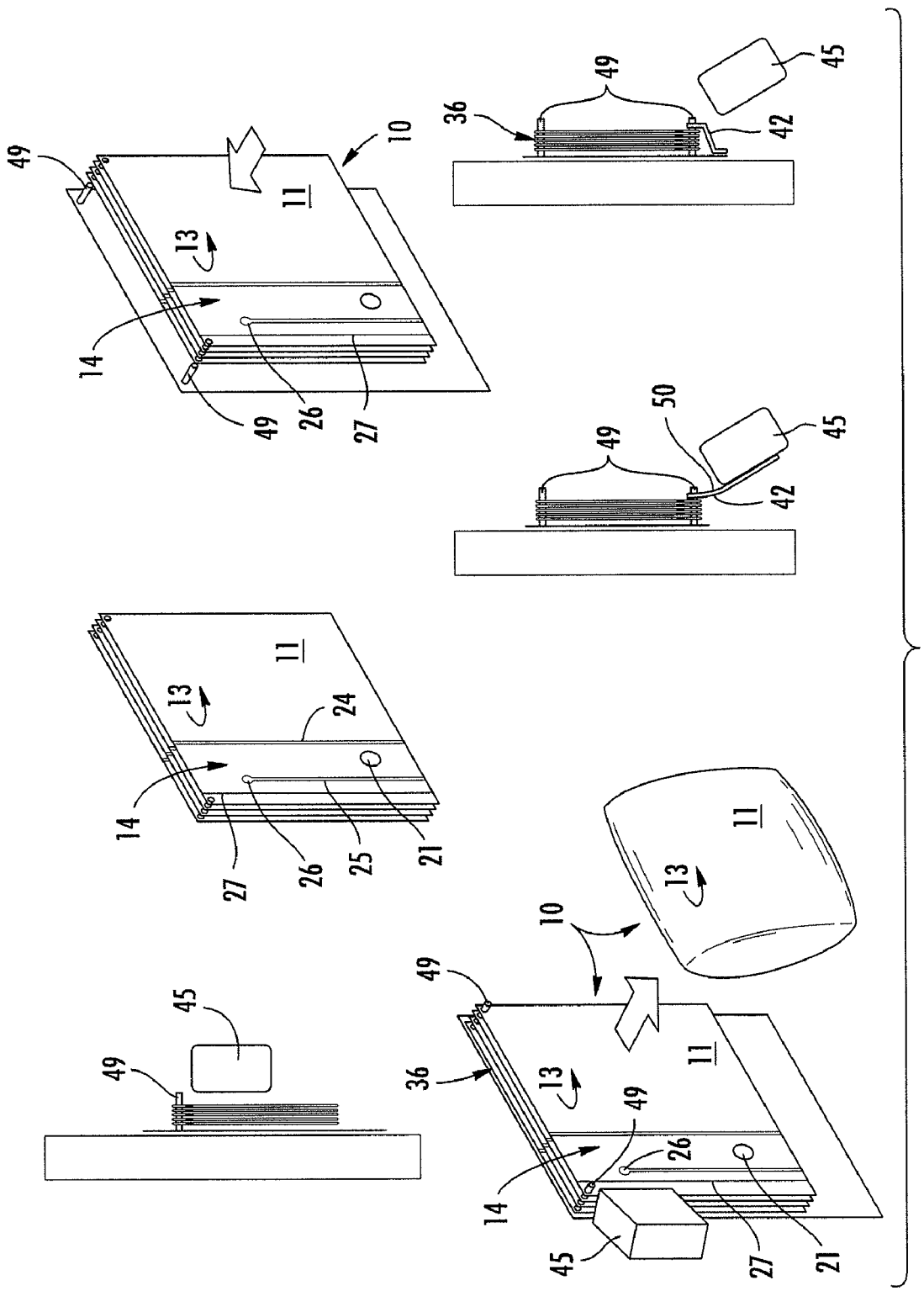
FIG. 15 is a perspective view of an embodiment of a cartridge-based inflatable structure inflation device in operation wherein the holder comprises pins.
Figure 16:
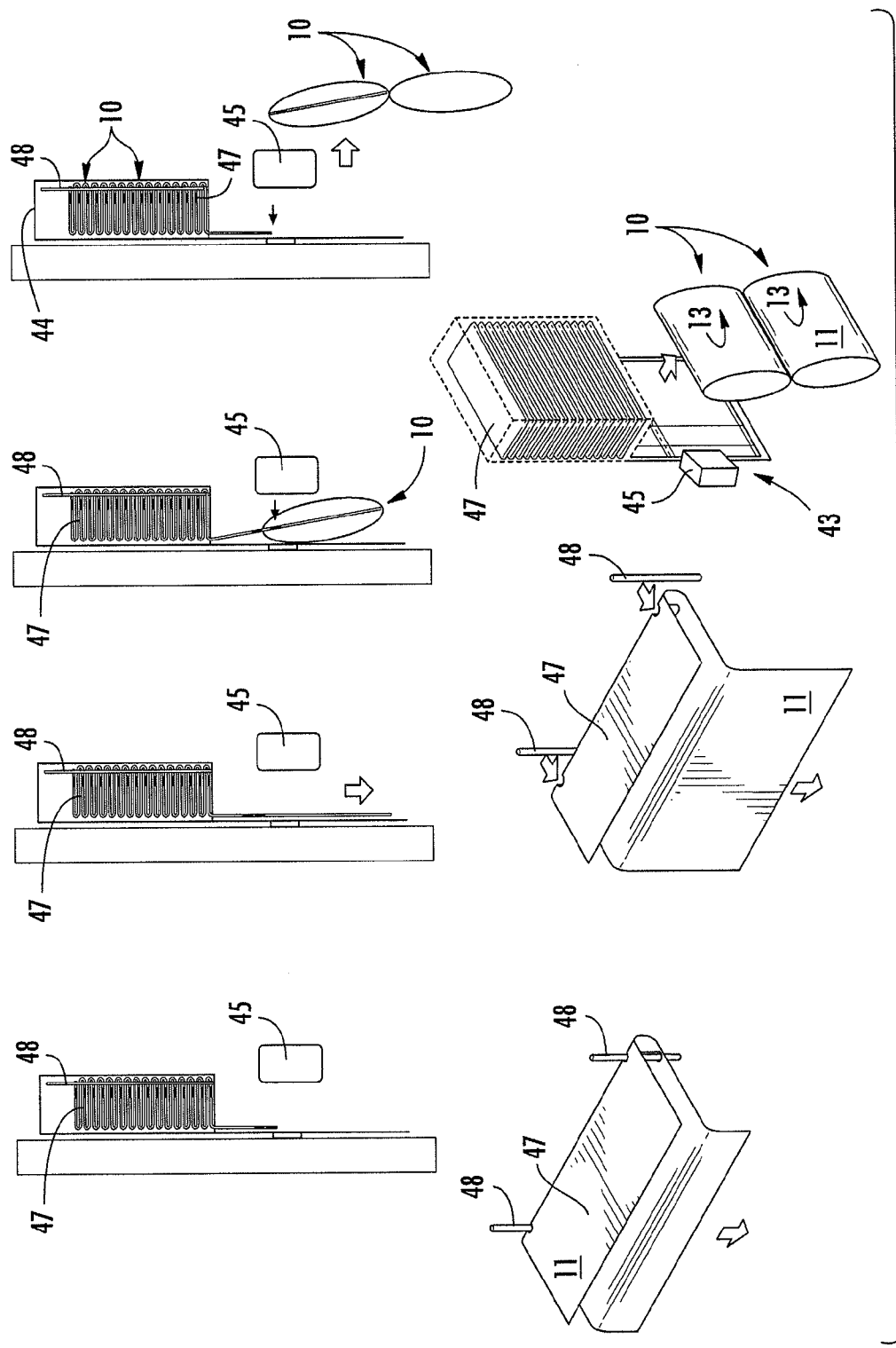
FIG. 16 is a perspective view of an embodiment of a fold-based inflatable structure inflation device in operation.

The finished product from the above described process may take the form of a continuous web of inflatable structures 10. Such a continuous web may then be packaged in a number of different manners so as to be ready for use. One such manner is to roll the continuous web into a roll 38, as shown in FIGS. 10-13. Another way to package the inflatable structures 10 is to fold them into a folded form 47, as shown in FIG. 16. Alternately, the continuous web may be cut into individual inflatable structures 10, and then connected together in the form of a cartridge 36, as shown in FIGS. 14, and 15. In one such embodiment, the second edge portion 28 of an inflatable structure 10 may be attached to the second edge portion of additional inflatable structures, as shown in FIGS. 14 and 15. Such cartridges 36 can be held together by a holder 42, which can take the form of a clamp, staple, rod, etc. If a holder 42 such as a staple is used, the holder must extend through a portion of the inflatable structure 10 other than the sidewalls 29, 30 so as to not puncture the enclosed chamber 13.

It is of note that these methods of inflatable structure 10 manufacturing may not require hole-alignment between different webs of flexible film 11. Elimination of this step is advantageous in that this is otherwise a difficult step in high-speed manufacturing.

An inflatable structure 10 inflation device 43 will now be discussed. With reference to FIGS. 10-13, there is pictured an embodiment of an inflation device 43. The inflation device 43 is comprised of a housing 44, an inflatable structure holder 42, and a source of pressurized air 45 with an outlet 46. The inflatable structure 10 inflation device 43 of this embodiment is designed to dispense a continuous web of inflatable structures, shown in FIGS. 10-13 as a roll 38 of inflatable structures. Other forms of webs of inflatable structures 10 could also be inflated such as a folded form 47 of the inflatable structures as shown in FIG. 16.

Figure 10:
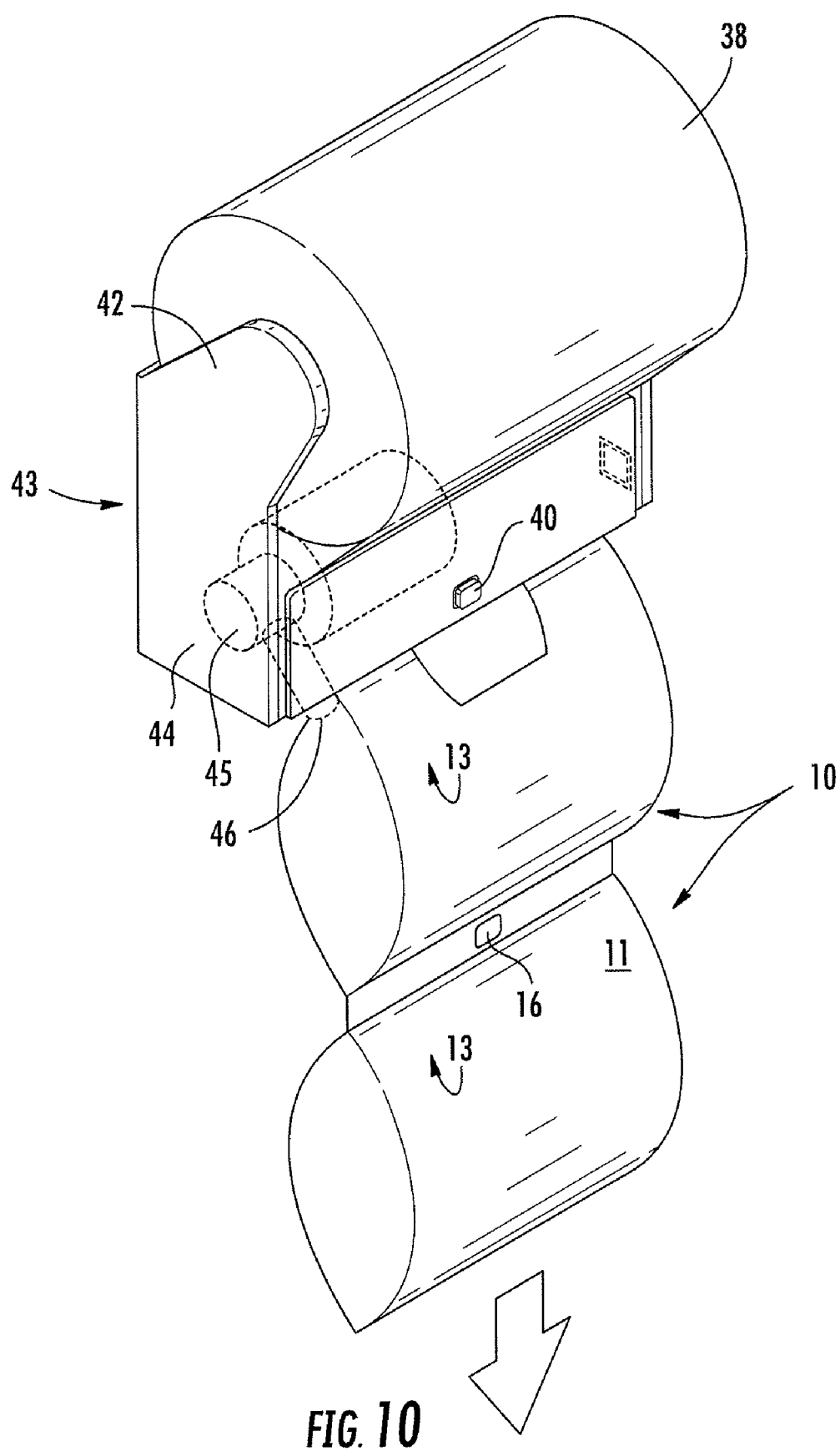
FIG. 10 is a perspective view of an embodiment of an inflatable structure inflation device with mechanical registration device for use with a roll of inflatable structures.
Figure 13:
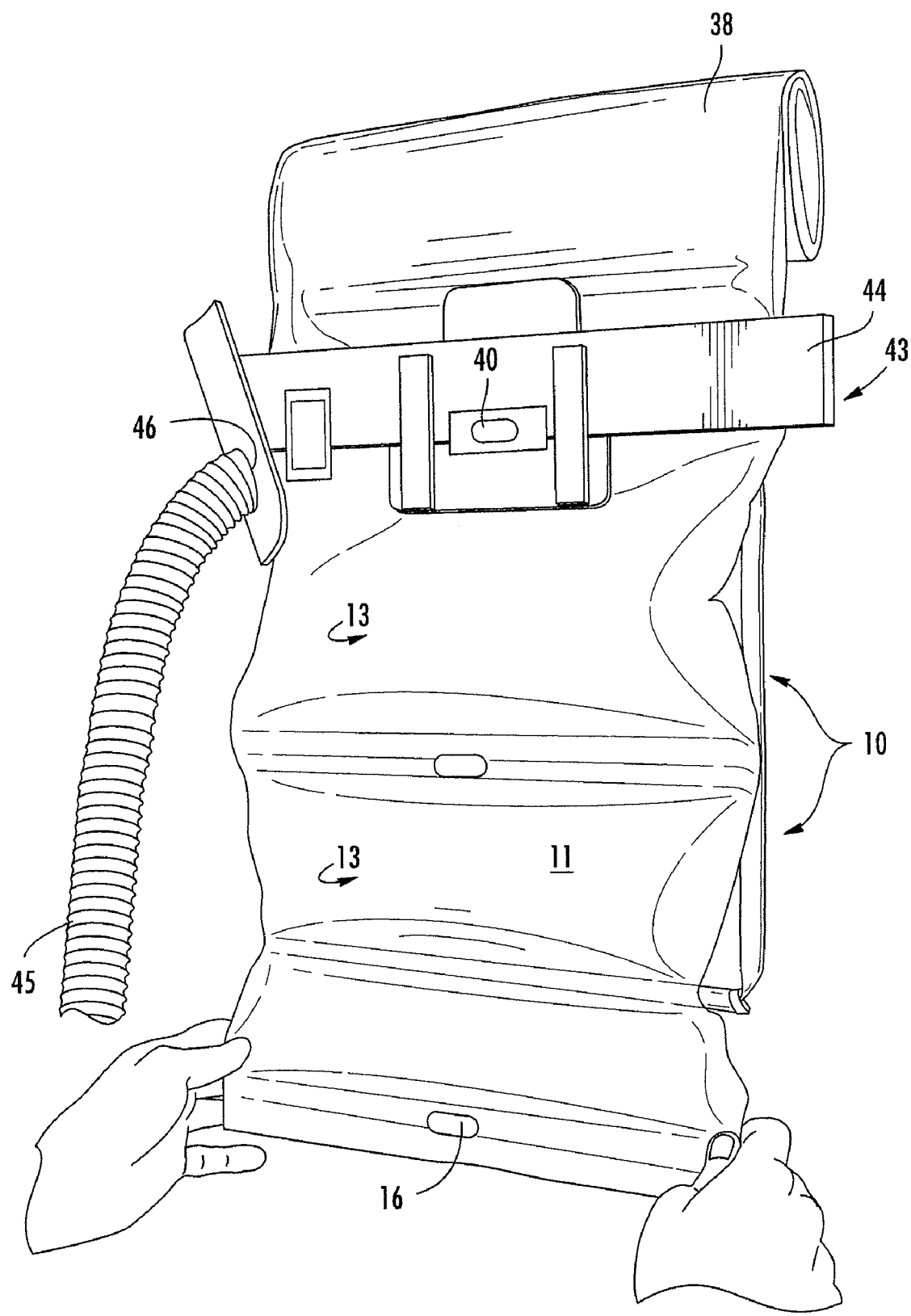
FIG. 13 is a perspective view of an embodiment of a wall-mounted roll-based inflatable structure inflation device in operation wherein the source of pressurized air is distant from the outlet.

As seen in FIGS. 10 and 13, the inflation device 43 may further include a mechanical registration device 40 for engaging locator apertures 16 in the inflatable structures 10. The mechanical registration device 40 and locator apertures 16 can take a number of different corresponding forms. For example, the locator aperture 16 could be a slit, as shown in FIGS. 2, 3, and 7 or a rectangular shape with rounded corners, such as is shown in FIGS. 1, 4, 5, and 13. The mechanical registration device 40 takes a corresponding shape such as the rectangular embodiment with rounded corners as shown in FIG. 13, so as to temporarily engage the locator aperture 16 and hold the inflatable structure 10 in place.

In operation, the outlet 46 of the source of pressurized air 45 is proximate to the valve 14 when the inflatable structure 10 holder 42 dispenses the inflatable structure. This can be facilitated through use of the mechanical registration device 40. The mechanical registration device 40 temporarily engages locator apertures 16 which may be located in the perimeter seals 15 separating multiple inflatable structures 10. Hence the mechanical registration device 40 temporarily holds an inflatable structure 10 in such a position so as to allow for the outlet 46 of the source of pressurized air 45 to be near the valve 14 of the inflatable structure 10 and fill it with air. Alternatively, a visual indicator may be used to determine when the valve 14 is proximate to the outlet 46 of the source of pressurized air 45. For example, a line can be drawn on the inflatable structure 10 that matches up to a line on the inflation device 43 when the valve 14 is proximate to the outlet 46 of the source of pressurized air 45. Alternatively, an indicator on the inflation device 43 may line up with the perimeter seals 15 separating multiple inflatable structures 10. Various other such visual indicators may also be used.

This embodiment and the other embodiments shown and described in this application are all designed to allow for inflation-at-a-distance. This means that the outlet 46 of the source of pressurized air 45 and the inflatable structure 10 do not have to have any physical contact. The air flow 32 alone is capable of opening the valve 14 and filling the inflatable structure 10 without necessitating the use of an inflation needle, wand, nozzle, or other similar structures.

In this previously described embodiment shown in FIGS. 10-13 the inflation device 43 can inflate and dispense a continuous web of inflatable structures 10 held by an inflatable structure holder 42. Another such embodiment is shown in FIG. 16. In this embodiment, the holder 42 is designed to hold a continuous web of inflatable structures 10 that are in a folded form 47 and held by a pair of rods 48. These rods 48 are a type of mechanical registration device 40 that function similarly to the above described embodiments in that they help temporarily locate the valve 14 of the inflatable structure 10 proximate to the outlet 46 of a source of pressurized air 45 when an inflatable structure is pulled down from the holder 42.

However, alternate embodiments are contemplated such as the embodiments shown in FIGS. 14 and 15 wherein the inflatable structure 10 inflation device 43 is designed to fill inflatable structures which are packaged together in a cartridge 36. These embodiments can make use of an alternative type of an inflatable structure 10 holder 42 in the form of a clamp, which holds the inflatable structures together as a cartridge 36. The holder 42 can hold each of the inflatable structures 10 together by engaging a second edge portion 28 in the flexible film 11 that extends beyond a first edge portion 27 in the flexible film, as shown in FIGS. 14 and 15. This allows the valve 14 of the outermost inflatable structure 10 to remain exposed such that it can receive an air flow 32 exiting the outlet 46 of the source of pressurized air 45, and may further use the air flow to pin down at least a portion of the inflatable structure, such as the flexible film 11 extending from the second edge portion 28, during inflation. The holder 42 can also include one or more pins 49 holding the cartridges 36 together, as shown in FIG. 15. Additionally, the holder 42 can also comprise a diverter 50 so as to redirect the air flow 32 exiting the outlet 46 of the source of pressurized air 45 toward a valve 14 in the inflatable structure 10.

The methods of inflating the inflatable structures 10 will now be described. These methods of filling inflatable structures 10 do not necessitate physical contact between the outlet 46 of the source of pressurized air 45 and the inflatable structure 10. Further, the methods are herein meant to describe the use of air flow 32 that is either high pressure or low pressure. Low pressure air flow 32 refers to air flow which may be produced by a fan or blower or human-powered inflation (e.g., whistling or blowing), whereas high pressure air flow refers to compressed air.

While the inflation methods are herein described with respect to a particular order of steps, it is to be understood that such ordering will not necessarily be required, and that alternative ordering of steps and variations on the steps are possible. Further, for simplicity's sake, the inflation will generally be discussed in terms of inflating the inflatable structures 10 with air, although other gases or fluids such as water or liquid foodstuffs or medical products can be used.

Figure 11:
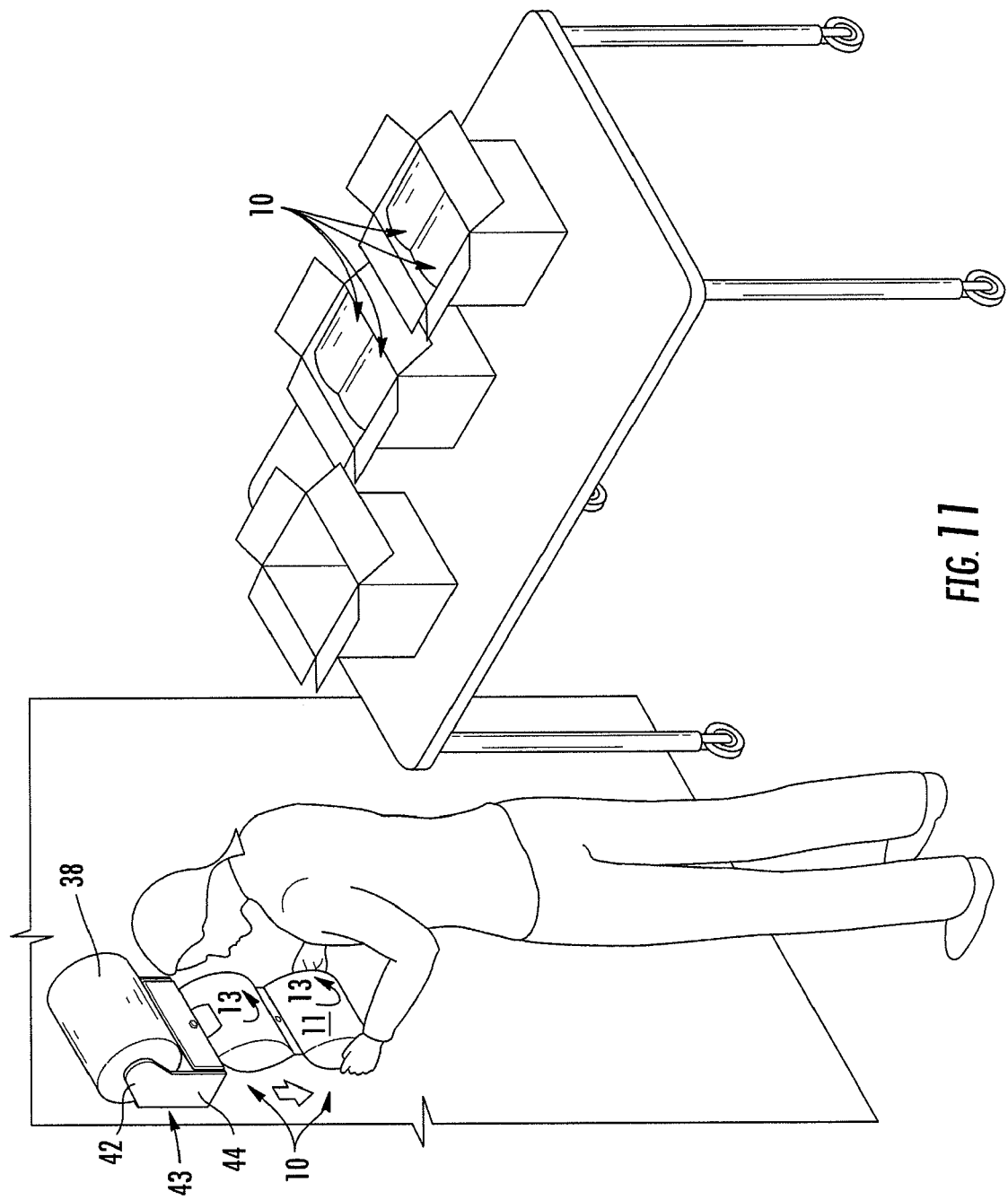
FIG. 11 is a perspective view of an embodiment of a wall-mounted roll-based inflatable structure inflation device in operation.
Figure 12:
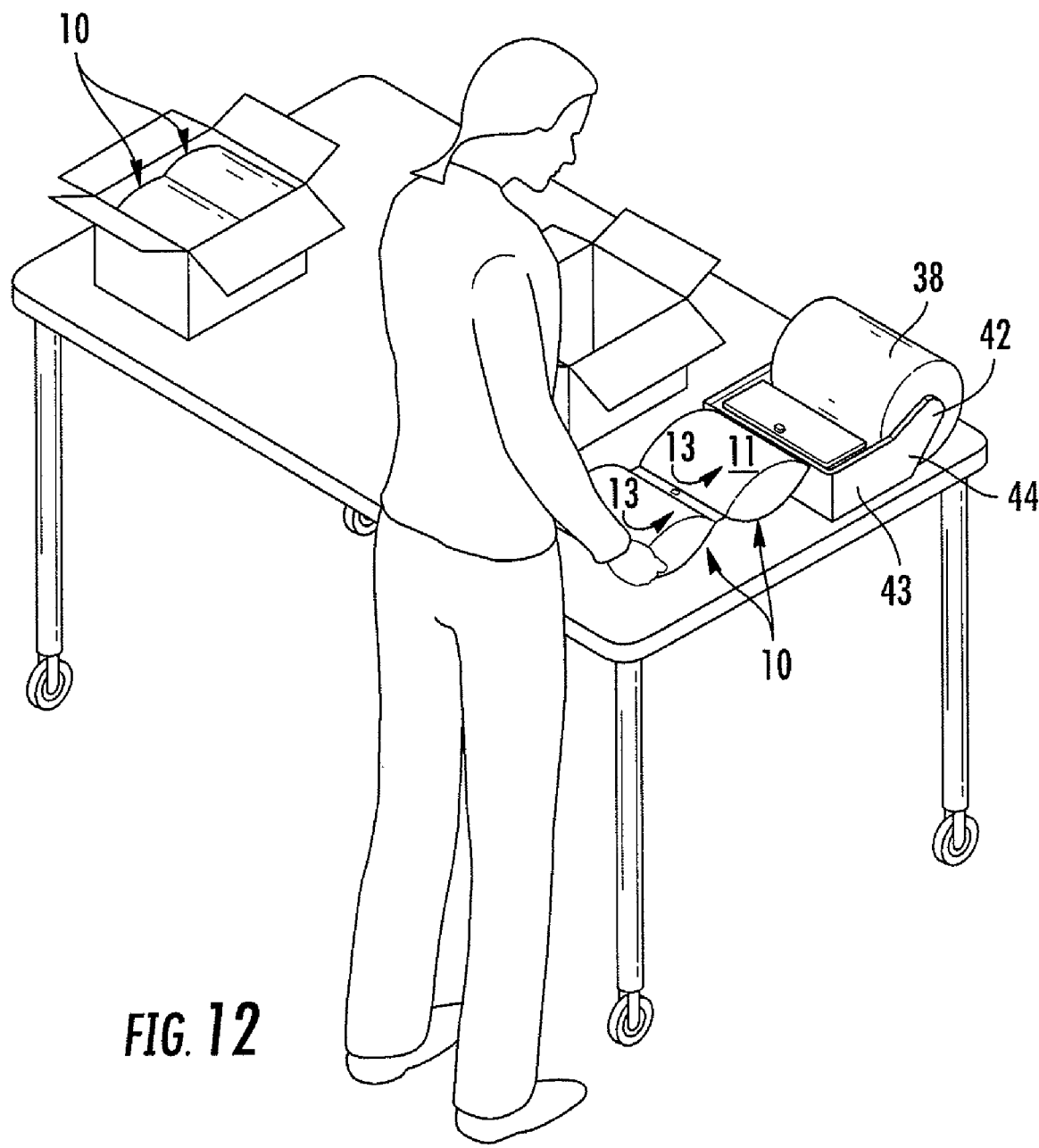
FIG. 12 is a perspective view of an embodiment of a table-mounted roll-based inflatable structure inflation device in operation

Additionally, the methods of inflating inflatable structures 10 are largely described in terms of manual human operation of the inflation device 43. However, the inflation device 43 may be fully or partially automated. For example, a drive motor may be used to feed the continuous web of inflatable structures 10 through the inflation device 43. The inflation device 43 may further be equipped with a controller that automatically fills the inflatable structures 10 with the desired amount of air. Furthermore, in some automatically driven embodiments, mechanical registration device 40 and locator apertures 16 may or may not be necessary, as the drive motor controller could stop the advance of the web of inflatable structures 10 to optimally allow for inflation. In particular, the drive motor could be commanded to stop with the valve 14 proximate to the outlet 46 of the source of pressurized air 45 when an optical sensor reads a visual indicator on the inflatable structure 10. Alternatively, the drive motor can be commanded to run slow enough to allow the inflatable structures 10 to fill without stopping for each inflatable structure. Also, the inflation device 43 may be oriented in a number of different ways. For example, the inflation device 43 may be wall-mounted, as shown in FIGS. 11 and 13, or table-mounted, as shown in FIG. 12.

With regard to the embodiments of the inflatable structure 10 inflation device 43 shown in FIGS. 10-13 and 16, their operation will now be described. An operator may first secure a continuous web of inflatable structures 10 with the holder 42. The operator can then turn on the source of pressurized air 45, which may constitute a blower. Next, the operator may pull on the first inflatable structure 10 until a valve 14 in the inflatable structure is proximate to the outlet 46 of the source of pressurized air 45. If the inflatable structure 10 inflation device 43 is equipped with a mechanical registration device 40 and the continuous web of inflatable structures is equipped with corresponding locator apertures 16, the continuous web of inflatable structures will stop when the mechanical registration device engages a locator aperture, and the inflatable structure inflation device is designed to have the outlet 46 of the source of pressurized air 45 proximate to the valve 14 at this point. Alternately, or additionally, the inflatable structure 10 or the inflation device 43 or both may have a visual indicator which reaches a point of optical alignment when the valve 14 is proximate to the outlet 46 of the source of pressurized air 45. Alternately, the operator may simply pull on the continuous web of inflatable structures 10 and not stop each time a valve 14 passes the outlet 46 of the source of pressurized air 45. This is possible when the source of pressurized air 45 emits sufficient air flow 32.

When the valve 14 and outlet 46 are thus proximate to each other, the source of pressurized air 45 will fill the inflatable structure 10 with air. "Proximate" here means that the valve 14 and the outlet 46 of the source of pressurized air 45 are located relative to one another such that an air flow 32 from the outlet reaches the valve and is able to penetrate the valve and enter into an enclosed chamber 13 in the inflatable structure 10, as shown in FIG. 8. As is the case throughout this application, the source of pressurized air 45 does not have to operate at a high pressure nor does the outlet 46 require contact with the inflatable structure 10. Instead, the source of pressurized air 45 may emit a low pressure air flow 32, and the outlet 46 may be physically separated from the inflatable structure 10. Once the inflatable structure 10 has reached the desired level of fullness, the operator can then either repeat the previous steps by pulling on the continuous web of inflatable structures to access the next inflatable structure, or the operator can tear the filled inflatable structure off from the remainder of the continuous web of inflatable structures. Filling of an inflatable structure 10 may substantially automatically lift the locator aperture 16 off of the mechanical registration device 40 such that the inflation device 43 is ready to advance the continuous web of inflatable structures 10 and fill the next inflatable structure 10. Also, the mechanical registration device 40 may be joined to the remainder of the inflation device 43 by a hinge or flexible connector such that the inflation of the inflatable structure 10 dislodges the mechanical registration device from the locator aperture 16.

The amount of air that fills the inflatable structure 10 may be controlled in a number of ways. One such method is by visual inspection of the inflatable structure 10 whereby the operator would remove the inflatable structure from proximity with the outlet 46 of the source of pressurized air 45 when the inflatable structure is filled with the desired amount of air. Alternatively, the inflatable structure 10 may automatically release from the inflation device 43 when the mechanical registration device 40 dislodges from the locator aperture 16 upon the filling of the inflatable structure, as discussed above. An alternative or additional way of controlling the level of inflation is to use inflation restriction structures to control the dimensions of the inflatable structure 10 as it inflates. Inflation restriction structures can take the form of plates or bars between which the inflatable structures 10 inflate. As the inflatable structures 10 fill, the inflation restriction structures can restrict the dimensional expansion of the inflatable structures, and hence limit the amount of air that fills the inflatable structures.

With regard to the embodiments of the inflation device 43 shown in FIGS. 14, and 15, the method of operation will now be described. In these embodiments, the operation may begin by placing a cartridge 36 of inflatable structures 10 in the holder 42. The inflatable structures 10 may be connected to one another prior to insertion in the holder 42, as through use of a staple, heat seal, or adhesive, or the holder can operate to clamp them together. The operator may then turn on the source of pressurized air 45, which results in an air flow 32. The outlet 46 of the source of pressurized air 45 can be aimed at the valve 14 of the outermost inflatable structure 10. Alternatively it may be aimed at the holder 42, which can comprise a diverter 50 to direct the air flow 32 toward the valve 14 of the outermost inflatable structure 10. When the inflatable structure 10 has reached the desired level of fullness, the operator then removes the inflatable structure. Removing the filled inflatable structure 10 may involve pulling the inflatable structure out from the holder 42. The process can then be repeated to inflate additional inflatable structures 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An inflatable structure for use in packaging comprising:
   at least one flexible film defining first and second film layers and defining an enclosed chamber;
   at least one one-way valve defined at least in part by the flexible film for receiving pressurized air directed generally in a first direction and thereby inflating the enclosed chamber,
   wherein the one-way valve comprises an internal edge portion formed by a fold in the flexible film positioned inside the enclosed chamber and spaced from an external valve opening that is defined at least in part by outer edge portions of the first and second layers of the flexible film,
   wherein the one-way valve is bounded at least in part by the internal edge portion and the outer edge portions, and
   further wherein the outer edge portions of the first and second layers of the flexible film are formed by folding the flexible film in the first direction such that the outer edge portions extend in a second direction substantially transverse with the first direction.

2. The inflatable structure of claim 1, further comprising one or more seals that join together the first and second layers of the flexible film so as to define a channel with the internal edge portion.

3. The inflatable structure of claim 2, wherein one or more slits extend through the one or more seals.

4. The inflatable structure of claim 2, wherein the one or more seals are rounded proximate to the external valve opening.

5. The inflatable structure of claim 1, wherein the internal edge portion comprises a seal.

6. The inflatable structure of claim 1, wherein the inflatable structure defines a planar direction substantially perpendicular to the outer edge portions, and wherein the outer edge portions are offset in the planar direction.

7. The inflatable structure of claim 2, wherein sidewalls extend from the outer edge portions, and wherein the sidewalls are connected by one or more perimeter seals.

8. The inflatable structure of claim 7, wherein perforations extend between the perimeter seals so as to allow for separation of the flexible film into multiple inflatable structures.

9. The inflatable structure of claim 7, wherein one or more locator apertures are defined between the perimeter seals.

10. The inflatable structure of claim 1, wherein the one-way valve further comprises an internal valve opening proximate to the internal edge portion.

* * * * *